US011606240B1

(12) United States Patent
Pirot

(10) Patent No.: US 11,606,240 B1
(45) Date of Patent: Mar. 14, 2023

(54) USING PREAMBLE PORTION HAVING IRREGULAR CARRIER SPACING FOR FREQUENCY SYNCHRONIZATION

(71) Applicant: Silicon Laboratories Inc., Austin, TX (US)

(72) Inventor: Frederic Pirot, Cesson-Sevigne (FR)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/536,732

(22) Filed: Nov. 29, 2021

Related U.S. Application Data

(60) Provisional application No. 63/250,533, filed on Sep. 30, 2021, provisional application No. 63/250,542, filed on Sep. 30, 2021, provisional application No. 63/250,555, filed on Sep. 30, 2021.

(51) Int. Cl.
*H04L 27/26* (2006.01)

(52) U.S. Cl.
CPC ...... *H04L 27/2655* (2013.01); *H04L 27/2605* (2013.01); *H04L 27/2649* (2013.01)

(58) Field of Classification Search
CPC ............. H04L 27/2655; H04L 27/2605; H04L 27/2649
See application file for complete search history.

(56) References Cited

U.S. PATENT DOCUMENTS

| | | | |
|---|---|---|---|
| 5,835,529 A | 11/1998 | Koga et al. | |
| 7,515,655 B2 | 4/2009 | Uchida et al. | |
| 7,688,910 B2 | 3/2010 | Takano | |
| 7,822,397 B2 | 10/2010 | Horvath et al. | |
| 8,194,807 B2 | 6/2012 | Pirot | |
| 8,396,427 B2 | 3/2013 | Le Guillou et al. | |
| 8,446,990 B2 | 5/2013 | Liu | |
| 8,705,679 B1 | 4/2014 | Venkatesh et al. | |
| 8,717,865 B2 | 5/2014 | Yang et al. | |
| 8,718,117 B2 | 5/2014 | Hiscock | |
| 8,837,652 B2 | 9/2014 | Stern | |
| 8,891,592 B1 | 11/2014 | Zhang et al. | |
| 8,948,295 B1 | 2/2015 | Nishikawa | |
| 9,113,490 B2 | 8/2015 | Porat et al. | |
| 9,300,510 B2 | 3/2016 | You et al. | |

(Continued)

OTHER PUBLICATIONS

United States Patent Office, Office Action dated Jun. 24, 2022 in U.S. Appl. No. 17/536,782 (41 pages).

(Continued)

*Primary Examiner* — Rahel Guarino
(74) *Attorney, Agent, or Firm* — Trop, Pruner & Hu, P.C.

(57) ABSTRACT

In one embodiment, an apparatus includes: a radio frequency (RF) front end circuit to receive and downconvert a RF signal to a second frequency signal, the RF signal comprising an orthogonal frequency division multiplexing (OFDM) transmission; a digitizer coupled to the RF front end circuit to digitize the second frequency signal to a digital signal; and a baseband processor coupled to the digitizer to process the digital signal. The baseband circuit comprises a first circuit having a first plurality of correlators having an irregular comb structure, each of the first plurality of correlators associated with a carrier frequency offset and to calculate a first correlation on a first portion of a preamble of the OFDM transmission.

20 Claims, 12 Drawing Sheets

(56) References Cited

U.S. PATENT DOCUMENTS

| | | |
|---|---|---|
| 9,432,079 B1 | 8/2016 | Kumar |
| 9,455,845 B2 | 9/2016 | Parker et al. |
| 9,614,557 B1 | 4/2017 | Mayer et al. |
| 9,780,985 B1 | 10/2017 | Tom et al. |
| 10,312,955 B1 | 6/2019 | De Ruijter et al. |
| 10,720,948 B2 | 7/2020 | De Ruijter et al. |
| 10,893,477 B2 | 1/2021 | Vijayan et al. |
| 11,101,842 B2 | 8/2021 | Hormis et al. |
| 11,143,735 B2 | 10/2021 | Lehtimaki |
| 11,206,122 B1 | 12/2021 | Mudulodu |
| 2004/0005018 A1 | 1/2004 | Zhu et al. |
| 2005/0213689 A1* | 9/2005 | Matsuda ............... H04L 27/265 375/324 |
| 2006/0222095 A1 | 10/2006 | Niu et al. |
| 2006/0285478 A1 | 12/2006 | Gaikwad et al. |
| 2007/0002800 A1 | 1/2007 | Sondur et al. |
| 2007/0002981 A1 | 1/2007 | Gaikwad et al. |
| 2007/0004347 A1 | 1/2007 | Sondur |
| 2007/0014227 A1 | 1/2007 | Nakao |
| 2007/0019749 A1 | 1/2007 | Gaikwad et al. |
| 2007/0019750 A1 | 1/2007 | Gaikwad et al. |
| 2008/0205540 A1 | 8/2008 | Takeda et al. |
| 2008/0247476 A1 | 10/2008 | Pirot |
| 2008/0310532 A1 | 12/2008 | Baggen et al. |
| 2009/0067517 A1 | 3/2009 | Hung et al. |
| 2010/0061493 A1 | 3/2010 | Takahashi et al. |
| 2010/0303175 A1 | 12/2010 | Pirot |
| 2010/0303183 A1 | 12/2010 | Desai |
| 2011/0013583 A1 | 1/2011 | Yang et al. |
| 2011/0194544 A1 | 8/2011 | Yang et al. |
| 2011/0194545 A1 | 8/2011 | Yang et al. |
| 2011/0212698 A1 | 9/2011 | Le Guillou et al. |
| 2011/0293040 A1 | 12/2011 | Dupont et al. |
| 2012/0051454 A1 | 3/2012 | Zheng et al. |
| 2012/0170680 A1 | 7/2012 | Stern |
| 2012/0224570 A1 | 9/2012 | Seok et al. |
| 2012/0236971 A1 | 9/2012 | Nasrabadi et al. |
| 2012/0269125 A1 | 10/2012 | Porat et al. |
| 2012/0324315 A1 | 12/2012 | Zheng et al. |
| 2012/0327871 A1 | 12/2012 | Ghosh et al. |
| 2013/0107981 A1 | 5/2013 | Sampath et al. |
| 2013/0121306 A1 | 5/2013 | Murakami et al. |
| 2013/0215993 A1 | 8/2013 | Nasrabadi et al. |
| 2013/0230120 A1 | 9/2013 | Yang et al. |
| 2013/0286961 A1 | 10/2013 | Vermani et al. |
| 2013/0315169 A1 | 11/2013 | Porat et al. |
| 2014/0153614 A1 | 6/2014 | Parker et al. |
| 2014/0160915 A1 | 6/2014 | Chen |
| 2015/0023272 A1 | 1/2015 | Choi et al. |
| 2015/0117227 A1 | 4/2015 | Zhang et al. |
| 2015/0146653 A1 | 5/2015 | Zhang et al. |
| 2015/0201296 A1 | 7/2015 | Oh et al. |
| 2015/0304078 A1 | 10/2015 | Cao et al. |
| 2015/0326408 A1 | 11/2015 | Vermani et al. |
| 2015/0349995 A1 | 12/2015 | Zhang et al. |
| 2016/0197756 A1 | 7/2016 | Mestdagh |
| 2017/0134203 A1 | 5/2017 | Zhu et al. |
| 2017/0202028 A1 | 7/2017 | Gaal et al. |
| 2017/0223743 A1 | 8/2017 | Lin et al. |
| 2019/0081838 A1 | 3/2019 | Qu et al. |
| 2019/0253101 A1 | 8/2019 | Kilian et al. |
| 2019/0288897 A1 | 9/2019 | Bui Do et al. |
| 2020/0021471 A1 | 1/2020 | Mosset et al. |
| 2020/0052945 A1 | 2/2020 | Kant et al. |
| 2020/0091944 A1 | 3/2020 | Sundström et al. |
| 2020/0220754 A1 | 7/2020 | Hunter et al. |
| 2020/0245363 A1 | 7/2020 | Kim et al. |
| 2021/0044981 A1 | 2/2021 | Bhattad et al. |
| 2021/0045125 A1 | 2/2021 | Mondal et al. |
| 2021/0067391 A1 | 3/2021 | Sengupta et al. |
| 2021/0176780 A1 | 6/2021 | Kang et al. |
| 2021/0185722 A1 | 6/2021 | Li et al. |
| 2021/0194743 A1 | 6/2021 | Gu et al. |
| 2021/0250125 A1 | 8/2021 | Park et al. |
| 2021/0298048 A1 | 9/2021 | Sosnin et al. |
| 2021/0344540 A1 | 11/2021 | Park et al. |
| 2021/0359885 A1 | 11/2021 | Shellhammer et al. |
| 2021/0399822 A1 | 12/2021 | Yang et al. |
| 2022/0110087 A1 | 4/2022 | Smith et al. |
| 2022/0173881 A1 | 6/2022 | Mudulodu |
| 2022/0173882 A1 | 6/2022 | Mudulodu |

OTHER PUBLICATIONS

United States Patent Office, Office Action dated Jun. 8, 2022 in U.S. Appl. No. 17/536,806 (29 pages).
IEEE Computer Society; "IEEE Standard for Low-Rate Wireless Networks," IEEE SA Standards Board, May 6, 2020, pp. 1-799.
United States Patent Office, Notice of Allowance dated Oct. 14, 2022, 2022, in U.S. Appl. No. 17/536,782, 38 pages.
United States Patent Office, Notice of Allowance dated Sep. 30, 2022, in U.S. Appl. No. 17/536,806, 29 pages.
Lee et al., "High accuracy and low complexity timing offset estimation for MIMO-OFDM receivers," IEEE Wireless Communications and Networking Conference, 2006, WCNC 2006, 2006, pp. 1439-1443.
United States Patent Office, Reply to Office Action filed Sep. 26, 2022, in U.S. Appl. No. 17/536,782, 6 pages.
United States Patent Office, Reply to Office Action filed Sep. 8, 2022, in U.S. Appl. No. 17/536,806, 7 pages.

* cited by examiner

USING PREAMBLE PORTION HAVING IRREGULAR CARRIER SPACING FOR FREQUENCY SYNCHRONIZATION

This application claims the benefit of U.S. Provisional Application No. 63/250,533, filed on Sep. 30, 2021, in the name of Frederic Pirot entitled "System, Method And Apparatus For Irregular Pilot Comb For Robust Preamble Carrier Offset Synchronization," U.S. Provisional Application No. 63/250,542, filed on Sep. 30, 2021, in the name of Frederic Pirot entitled "System, Method And Apparatus For Full Complex Random Pilot Sequence For Orthogonal Frequency Division Multiplexing Symbol Generation" and U.S. Provisional Application No. 63/250,555, filed on Sep. 30, 2021, in the name of Frederic Pirot entitled "System, Method And Apparatus For Frequency Hopped Successive Orthogonal Frequency Division Multiplexing Symbols For Robust Preamble Detection And Synchronization," the disclosures of which are hereby incorporated by reference.

BACKGROUND

In some wireless communication systems, an orthogonal frequency division multiplexing (OFDM) waveform is used. Such waveform enables using the full available bandwidth with a nearly flat spectrum, and it is possible to remove inter-symbol interference, thanks to an added cyclic prefix, insertion of pilots among data is easy and can be used for simple synchronization/equalization.

With OFDM signals, especially in burst systems at very low signal-to-noise ratio (SNR), coarse synchronization on carrier frequency offset (CFO) of the incoming signal is sometimes badly estimated due to the regular frequency shape of the preamble symbols. Thus with OFDM signals at very low SNR, synchronization on a symbol within a precise time window is difficult to achieve. To do so, a detectable repetition of the signal is typically used. This will work down to a few decibels (dB) of SNR. Another technique is to introduce a detectable disruption on the signal. Classical disruptions like complex-phase inversion of a known signal sequence can typically work down to SNR on the order of 0 dB. However, for much lower SNR (e.g., −10 dB down to −20 dB), these techniques may be ineffective.

Another disadvantage of OFDM is its high Peak-to-Average Power Ratio (PAPR). This power ratio is an important aspect of the transmission because it impacts the maximum transmit power that can be achieved with a full transmission equipment. In modern standards, preambles are sometimes designed with specific care for power consumption vs transmission power. However in some standards, pilots are only modulated by binary sequences, and, based on this usually the chosen pilot sequence is the one among all the sequences that, matching other conditions, has the smallest PAPR.

SUMMARY OF THE INVENTION

In one aspect, an apparatus includes: a radio frequency (RF) front end circuit to receive and downconvert a RF signal to a second frequency signal, the RF signal comprising an orthogonal frequency division multiplexing (OFDM) transmission; a digitizer coupled to the RF front end circuit to digitize the second frequency signal to a digital signal; and a baseband processor coupled to the digitizer to process the digital signal. The baseband circuit comprises a first circuit having a first plurality of correlators having an irregular comb structure, each of the first plurality of correlators associated with a carrier frequency offset and to calculate a first correlation on a first portion of a preamble of the OFDM transmission.

In an example, the apparatus is to receive the first portion of the preamble having a first plurality of symbols, each of the first plurality of symbols having a plurality of carriers, wherein a first subset of the plurality of carriers have non-zero values. The apparatus may receive the plurality of carriers comprising N carriers, where N−M of the N carriers are the first subset having the non-zero values. At least some of the N−M carriers have irregular carrier spacing. The irregular comb structure of the first plurality of correlators may correspond to the irregular carrier spacing of the at least some N−M carriers. The apparatus may receive the non-zero values formed by a non-N-ary complex number sequence.

In an example, the apparatus further comprises a fast Fourier transform (FFT) engine to receive the OFDM transmission and to output the plurality of symbols each having the plurality of carriers in a frequency domain. The apparatus may receive the first plurality of symbols comprising identical symbols.

The first circuit may comprise a carrier frequency offset circuit to determine a carrier frequency offset based on the first correlation calculated by the first plurality of correlators. The baseband circuit further comprises a second circuit having a second plurality of correlators, each of the second plurality of correlators associated with a time-phase, the second portion of the preamble having at least one frequency disruption, each of the second plurality of correlators to calculate a second correlation on the second portion of the preamble. The apparatus may further include a non-volatile memory to store a first configuration setting to define the irregular comb structure of the first plurality of correlators.

In another aspect, a method comprises: receiving an OFDM transmission in a receiver; and performing a frequency estimation on a first preamble portion of the OFDM transmission using a plurality of correlators of the receiver, the first preamble portion formed of a plurality of symbols, each of the plurality of symbols having N−M non-zero carriers, where at least some of the N−M non-zero carriers are irregularly spaced.

In an example, the method further comprises using the plurality of correlators comprising a set of irregularly spaced comb correlators to perform the frequency estimation, where the set of irregularly spaced comb correlators corresponds to the irregular spacing of the at least some N−M non-zero carriers. The method may further comprise performing a coarse frequency estimation on the first preamble portion using the set of irregularly spaced comb correlators. The method may further include performing a fine frequency estimation on the first preamble portion based on the coarse frequency estimation and using the set of irregularly spaced comb correlators. The method may further include configuring the receiver for receipt of a data portion of the OFDM transmission based at least in part on the fine frequency estimation. Configuring the receiver may include adjusting a frequency of a mixing signal used to downconvert a RF signal of the OFDM transmission to a lower frequency signal.

In yet another aspect, a system comprises: an antenna to receive and transmit RF signals; and an integrated circuit coupled to the antenna. The integrated circuit may include: a transmitter to generate and transmit an OFDM transmission, the transmitter comprising a preamble generation circuit to generate a first portion of a preamble of the OFDM transmission having a first plurality of symbols, each of the first plurality of symbols having a plurality of carriers, where a first subset of the plurality of carriers have non-zero values, at least some of the first subset of the plurality of carriers having irregular carrier spacing.

In an example, the integrated circuit comprises a first storage to store an identification of the first subset of the plurality of carriers having the non-zero values. The transmitter may transmit the first portion of the preamble having the irregular carrier spacing to optimize coarse frequency processing at a receiver of the OFDM transmission.

DETAILED DESCRIPTION

Figure 1:
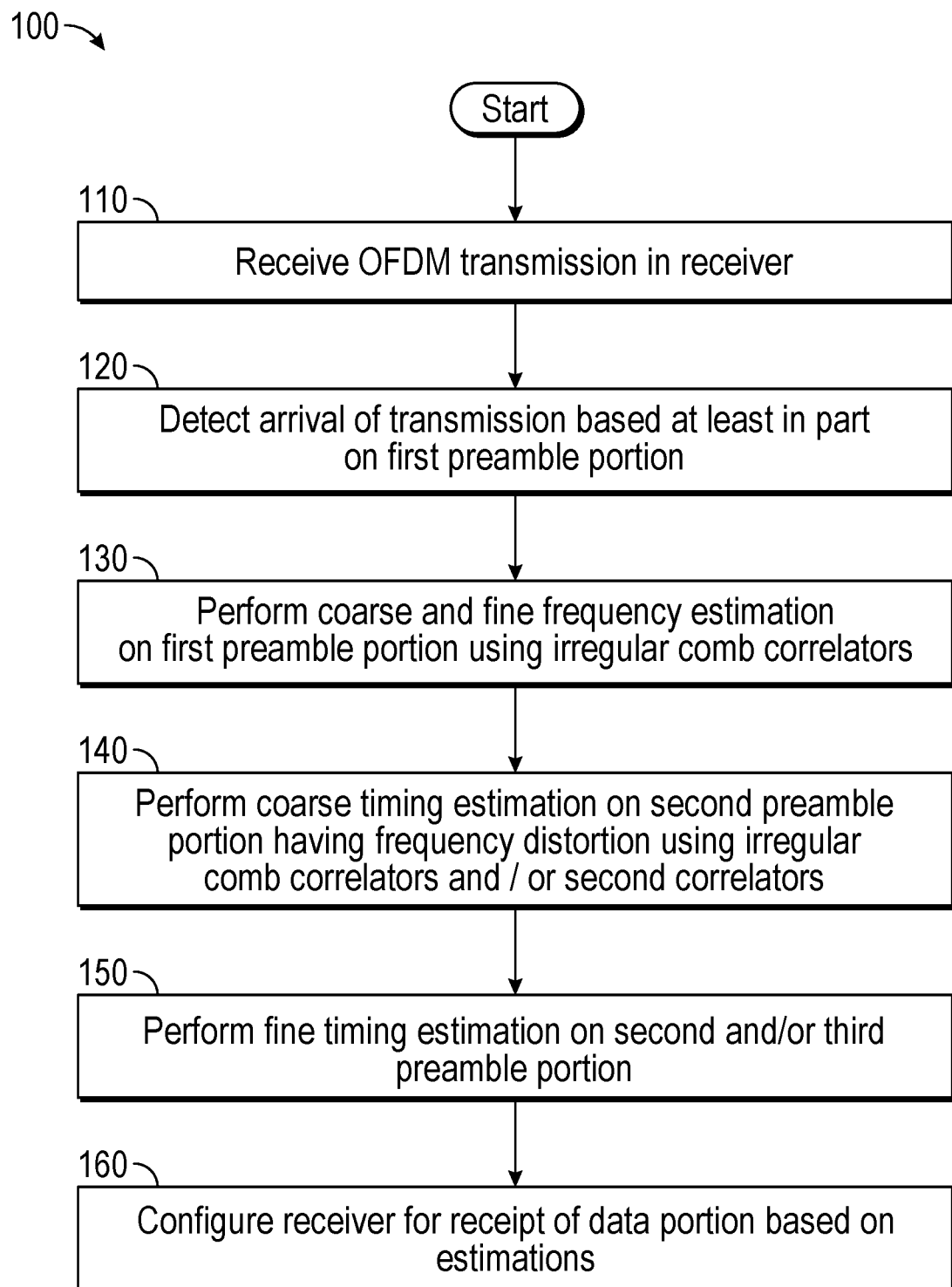
FIG. 1 is a flow diagram of a method in accordance with an embodiment.

In various embodiments, a preamble structure of a packet, frame or other block of information of a wireless communication may be provided to enable more efficient detection of an OFDM transmission. To this end, a preamble may be provided that can be detected easily, even with a potentially high carrier frequency shift. The preamble may include a first portion that has a relatively simple waveform structure. This first preamble portion may be long enough to perform detection (DET), coarse frequency (CF) and fine frequency (FF) algorithms (which means that these algorithms may be configured to be insensitive to the frame start position in time). Next, to detect the beginning of the packet, a second portion of the preamble may be provided with a disruption, e.g., a frequency disruption from symbol to symbol over time. As embodiments may operate in a very noisy environment, this preamble portion may have a relatively long disruption, to realize an efficient coarse time (CT) algorithm. This same second preamble portion and/or an optional third preamble portion (which may be formed of a complete fully known OFDM symbol) may be used to provide information to a fine time algorithm (FT).

In radio burst communication standards, a burst is typically constructed with a preamble, signalization, and a payload. The preamble is used for: detection of the data burst; coarse (approximative) synchronization in time; coarse (approximative) synchronization in frequency; fine (precise) synchronization in time; and fine (precise) synchronization in frequency. In a given receiver, all of these algorithms may be executed concurrently or successively, based at least in part as a function of preamble architecture and design choices. Signalization is used for transmission of modulation parameters, and the payload contains the useful data.

In an OFDM system, coarse synchronization in time involves finding the received OFDM symbol start with a precision of a few incoming samples (generally defined as a fraction of the OFDM symbol size). Coarse synchronization in frequency involves finding the frequency offset of the incoming signal with a precision of 1 OFDM carrier spacing. Fine synchronization in time involves finding the received OFDM symbol start with a precision of an incoming sample. Fine synchronization in frequency involves finding the residual frequency offset of the incoming signal with a precision of a fraction of 1 OFDM carrier spacing (typically 10% or below).

A perfect illustration of this frame structure is in a Wireless Smart Ubiquitous Network (Wi-SUN) network in which OFDM is used in accordance with the IEEE 802.15.4-2020 specification. In this OFDM radio burst standard, a packet is constructed according to this specification. In this specification, for a given packet there is 1 preamble; 1 PHY Header (PHR) for signalization; and 1 Payload (PSDU). The preamble is divided in 2 parts: a Short Training Field (STF); and a Long Training Field (LTF). In this preamble, the LTF is usually used for fine timing/fine frequency and other operations. The STF is usually used for detection, coarse frequency, fine frequency, and coarse timing. This STF itself can be divided in 2 parts: a long, stable part, used for: detection; coarse frequency; and fine frequency; and a short (complex-phase disruptive part) at the end of the STF that is used for coarse timing. The spectrum of the preamble (OFDM representation of the symbol in the frequency domain) has a frequency structure that is based on a subset of regularly spaced carriers modulated by a binary sequence. However, this Wi-SUN-based implementation may not work well in high noise environments.

In embodiments, various aspects of a preamble structure can be selected to enable receipt and processing of incoming OFDM communications at longer ranges and lower signal levels than available in a Wi-SUN implementation. More particularly, embodiments may be used to enable reception of OFDM communications at sensitivity levels down to approximately −130 dB. Thus embodiments may be used to enable reception of wireless communications at lower sensitivity levels. More particularly, embodiments may be used to receive signals that are lower than a noise level, while still detecting and demodulating the signals.

To this end, a first preamble portion may be provided with irregular carrier spacing, to enable better correlations to occur using correlators in a receiver that are tuned to this irregular carrier spacing. That is, these correlators also may have an irregular comb structure to correspond or match this irregular carrier spacing. In this way, these correlators may process incoming preambles to result in a better auto-correlation vs cross-correlation ratio and, in case of strong noise, limit the probability of a bad coarse CFO estimation due to correlation ambiguity between multiple different CFO correlator candidates.

Also in embodiments, better CFO processing may be realized where this first preamble portion is generated using a non-N-ary (e.g., non-binary) sequence of complex numbers, rather than a pilot sequence based on a modulated binary sequence as is used in Wi-SUN. Still further, the values used for this non-N-ary sequence of complex numbers may be selected to realize transmission having a minimum possible PAPR. To generate such a sequence, the criteria could be, for example pilots' position within the OFDM symbol (typically a regular pilot comb); and all pilots be transmitted with the same power. With this example, the liberty degree to generate minimum PAPR sequence would then be the complex-phase of the complex numbers.

Of course, pilots with different transmission power may be used and PAPR may be minimized by optimizing the complex-phase and the module of each carrier. In any case, the complex values for the pilots may be chosen for their PAPR optimization properties, with no other sequence consideration such as specific link to a binary sequence.

Still further in various embodiments, a series of frequency disruptions or carrier shifts may be provided in a second portion of a preamble (e.g., from one OFDM symbol to the next during this second preamble portion). With this arrangement, there may be successive disruptions, both on the time and frequency components of the signal. With an appropriate detection algorithm, symbol start may be detected with an acceptable time spreading at very low (e.g., negative) SNRs, allowing for longer distances between transmitter and receiver.

In one implementation, a sweep in frequency may occur in a second portion in which an original OFDM symbol of this second portion is shifted by one carrier from one symbol to the next symbol. Another possibility may be to use a predetermined frequency hopping sequence in which the original OFDM symbol is shifted by some number of carriers (following a predetermined hopping rule) from one symbol to the next.

Referring now to FIG. 1, shown is a flow diagram of a method in accordance with an embodiment. In the high level view shown in FIG. 1, method 100 is a method performed by a receiver to receive and process an incoming transmission, more particularly, an OFDM transmission. As shown, method 100 begins by receiving the OFDM transmission in the receiver (block 110). Understand that the receiver may receive this transmission from a transmitter to which it is wirelessly coupled. For example, in a given network there may be multiple devices, some or all of which may be capable of both transmission and reception by way of independent receiver and transmitter circuitry and/or consolidated transceivers.

In any event, in FIG. 1 this OFDM transmission may be received and processed in the receiver. Understand that various processing may be performed, including radio frequency (RF) processing to receive, amplify, filter, etc., and in turn, to downconvert the RF signal to a lower frequency (e.g., an intermediate frequency (IF), a low-IF, baseband or so forth). Then in turn, this lower frequency signal is digitized and various digital processing may be performed after conversion to the digital signal.

As illustrated in FIG. 1, this processing may include performing a detection as to the arrival of a valid transmission (block 120). This detection may be based at least in part on detection of a first portion of a preamble of the transmission. As will be described more fully herein, a preamble of a burst may include multiple portions.

In addition to detection, both coarse and fine frequency estimations may be performed on this first preamble portion (block 130). As shown in FIG. 1, irregular comb correlators of the receiver may be used in performing these frequency estimations to thus determine a carrier frequency offset. Such information regarding an identified carrier frequency offset may be used for compensation and other configuring of the receiver.

Still referring to FIG. 1, next at block 140, a coarse timing estimation may be performed on a second preamble portion that has a frequency distortion. More particularly, the irregular comb correlators and second correlators of the receiver may be used in this detection. Alternately, the coarse timing may be determined using only the second correlators. Note that this coarse timing thus identifies the start of a received OFDM symbol within some number of incoming samples (more generally as a fraction of the OFDM symbol size).

Still with reference to FIG. 1, next at block 150, a fine timing estimation may be performed on this second and/or an optional third preamble portion. This fine timing estimation may be used to identify the received symbol start, with a precision of one incoming sample. Based on the determined information, namely signal detection and the coarse and fine frequency and timing estimations, at block 160 the receiver may be configured to receive a data portion of the transmission. For example, compensations may be configured at various points of the receiver signal processing path to accommodate for any carrier frequency offset and to ensure that signal processing, including demodulation, correctly occurs at the start of a given symbol. Understand while shown at this high level in the embodiment of FIG. 1, many variations and alternatives are possible.

Figure 2:
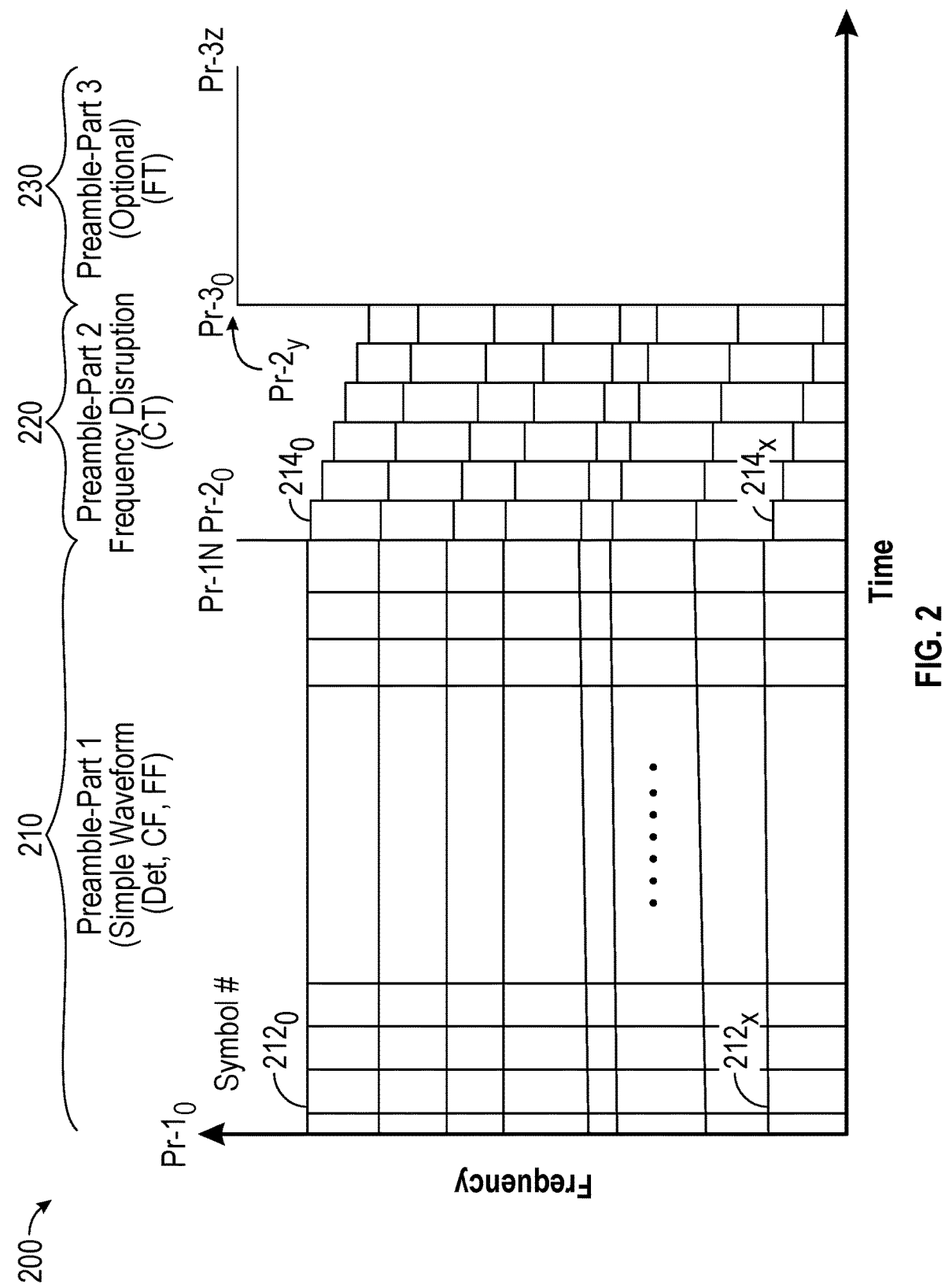
FIG. 2 is a graphical illustration of a preamble of an OFDM communication in accordance with an embodiment.

Referring now to FIG. 2, shown is a graphical illustration of a preamble of an OFDM communication in accordance with an embodiment. As shown in FIG. 2, preamble 200 includes separate portions, including a first portion 210, also referred to as a Preamble-Part1, a second portion 220 referred to as a Preamble-Part2, and an optional third portion 230, which may or may not be present in a given implementation.

Note that in FIG. 2, preamble 200 is shown in graphical illustration with the time domain along the x-axis and the frequency domain along the y-axis. As shown, first portion 210 may be formed as a simple waveform that may be used for purposes of signal detection and coarse and fine frequency estimations (namely coarse and fine carrier frequency offset determinations). As illustrated, this first portion includes a plurality of symbols Pr-10-Pr 1 N. Although embodiments are not limited in this regard, in one particular example, first portion 210 may be formed of 40 symbols. Note that in the illustration, each of these symbols may provide the same information. Specifically, first portion 210 may be implemented as having a relatively small number of non-zero carriers $212_0$-$212_x$. Since each symbol provides the same information, these non-zero carriers are shown as horizontal lines, indicating that each carrier includes the same value in each symbol. Also of significance, note that at least some of these carriers 212 have irregular spacing. Stated another way, there is not a constant offset between at least some of these non-zero carriers.

As will be described herein, the irregular spacing between these carriers can be used to better identify a correct carrier frequency offset, since corresponding correlators in a receiver may have a similar irregular comb structure. Although embodiments are not limited in this regard, in one example there may be twelve non-zero carriers 212. Further while different numbers of carriers may be provided in different examples, there may be 64, 128 or 256 carriers per symbol, as generated by a fast Fourier transform (FFT) engine (not shown in FIG. 2). More generally, there may be N−M non-zero carriers 212 (where N is greater than M, N being the total number of carriers in a symbol, and M being the number of zero carriers).

Still referring to FIG. 2, second portion 220 may be formed of a different number of symbols Pr-20-Pr 2Y. Although embodiments are not limited in this regard, in one example there may be thirteen symbols in this second preamble portion. As shown, each symbol may be frequency disrupted (having a carrier shift from one symbol to the next), in that the active non-zero carriers ($214_0$-$214_x$) are at different carriers. This frequency disruption portion may be used to perform a coarse timing estimation as will be described further herein (and possibly also for fine timing estimation). Understand that in different implementations, various frequency disruptions, including frequency sweeps, hops, mixes and so forth may be present. Further, while irregular carrier spacing is shown in this example, it is possible for the active non-zero carriers 214 to have a regular spacing. Also understand that there need not be the same number of active non-zero carriers in second portion 220 as there are in first portion 210.

With further reference to FIG. 2, a preamble 200 may include an optional third preamble portion 230 that may be implemented as another plurality of symbols Pr-30-Pr-3Z. In one embodiment, each of these symbols may be formed as a complete fully known OFDM symbol that can be used for purposes of performing a fine timing estimation (where such fine timing estimation is not done using second preamble portion 220). Understand while shown at this high level in the embodiment of FIG. 2, many variations and alternatives of a preamble in accordance with an embodiment may be possible.

Figure 3:
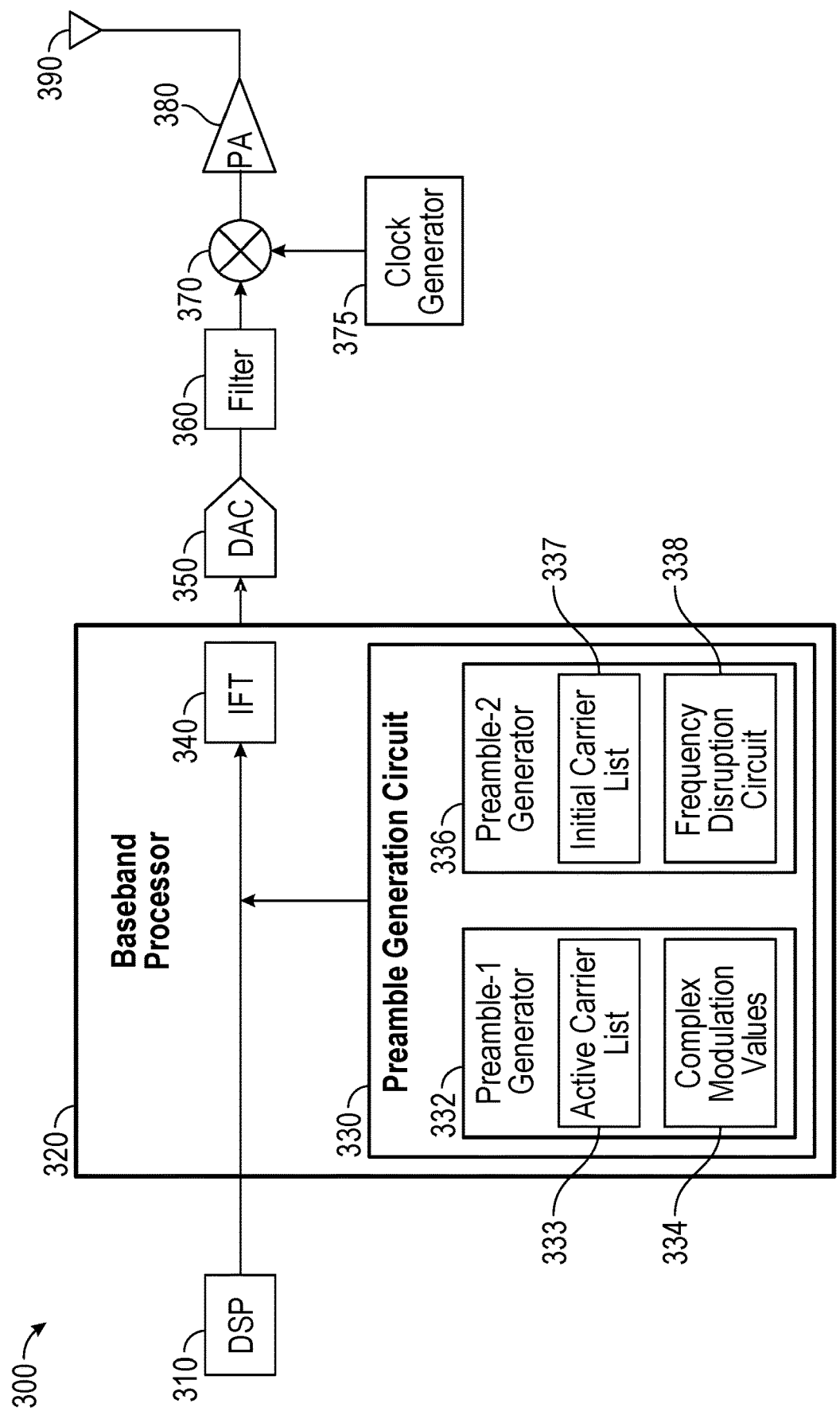
FIG. 3 is a block diagram of a transmitter in accordance with an embodiment.

Referring now to FIG. 3, shown is a block diagram of a transmitter in accordance with an embodiment. More specifically as shown in FIG. 3, a transmitter 300, which may be implemented as part of transceiver circuitry of an IoT or other integrated circuit, includes a digital signal processor (DSP) 310. In other cases, transmitter 300 may be a stand-alone transmitter.

In any event, DSP 310 may process information to be communicated in an OFDM transmission. In turn, the message information, e.g., digital message information, is provided to a baseband processor 320. For purposes of OFDM communication, this message information may be packaged, modulated and further processed. Finally, the message information, which may be in the frequency domain as a plurality of symbols each having multiple carriers, may be converted to a time domain signal via an inverse Fourier transform (IFT) engine 340.

Note that prior to transmitting the actual content of a message, first a preamble may be generated and sent. Thus as shown in FIG. 3, a preamble generation circuit 330 may be provided within baseband processor 320. As shown, preamble generation circuit 330 includes multiple preamble generators, including a first preamble generator 332 and a second preamble generator 336. Although not shown, understand that additional preamble generation circuitry may be present to form additional preamble portions such as an optional third preamble portion.

First preamble generator 332 may be configured to generate a first portion of a preamble. As shown, first preamble generator 332 includes storages 333 and 334 that may store information including an active carrier list and complex modulation values. Note that this information may be stored in a memory structure, such as registers, random access memory or so forth. In different implementations, this information may be obtained from a non-volatile storage, e.g., as part of firmware that is loaded into transmitter 300 during initialization.

In embodiments, the active carrier list may be a list having an identification of active (non-zero) carriers for this first preamble portion. As discussed above, different numbers of non-zero carriers may be present. In one example, there may be twelve non-zero carriers. Further as discussed above, these non-zero carriers may have irregular spacing. In addition, these non-zero carriers may be modulated using complex modulation values, as stored in storage 334. By using complex modulation values that may be of a non-N-ary sequence, this preamble portion may be generated having a minimal PAPR.

Understand in the implementation of FIG. 3, first preamble generator 332 may use the information in storages 333, 334 to generate symbols of the first preamble portion that have selected, irregularly spaced non-zero carriers using complex modulation values. In other cases first preamble generator 332 may be configured to generate a first preamble portion that has regularly spaced non-zero carriers modulated with complex modulation values. Still other variations are possible. For example, in yet other implementations another design may be used for the first preamble portion such as irregularly spaced non-zero carrier modulated in another manner, such as via a binary sequence.

Referring now to second preamble generator 336, included therein is a storage 337 and a frequency disruption circuit 338. Storage 337 may store an initial carrier list that identifies which carriers are to be active for a first symbol of a second preamble portion. Frequency disruption circuit 338 may be configured to generate the second preamble portion by applying a given carrier shift or other frequency disruption from one symbol to the next during this second preamble portion. In this way, second preamble generator 336 may generate a first symbol according to the initial carrier list stored in storage 337. Then the carriers may be updated from one symbol to the next according to the configuration of frequency disruption circuit 338. For example, one or more of frequency shifting or hopping may occur from one symbol to the next during this second preamble portion by adjusting active carriers via frequency disruption circuit 338.

Baseband processor 320 may output OFDM symbols in the time domain, such that for a given transmission first a preamble is generated and sent and then symbols having the message content are sent. As shown, the OFDM transmission may be converted into an analog signal via a digital-to-analog converter (DAC) 350. This signal may be filtered in a filter 360. Thereafter the signal may be upconverted to an RF level via a mixer 370, which receives a mixing signal from a clock generator 375. Then the RF signal may be amplified in a power amplifier 380 and transmitted via an antenna 390. Understand while shown at this high level in the embodiment of FIG. 3, many variations and alternatives are possible.

Figure 4:
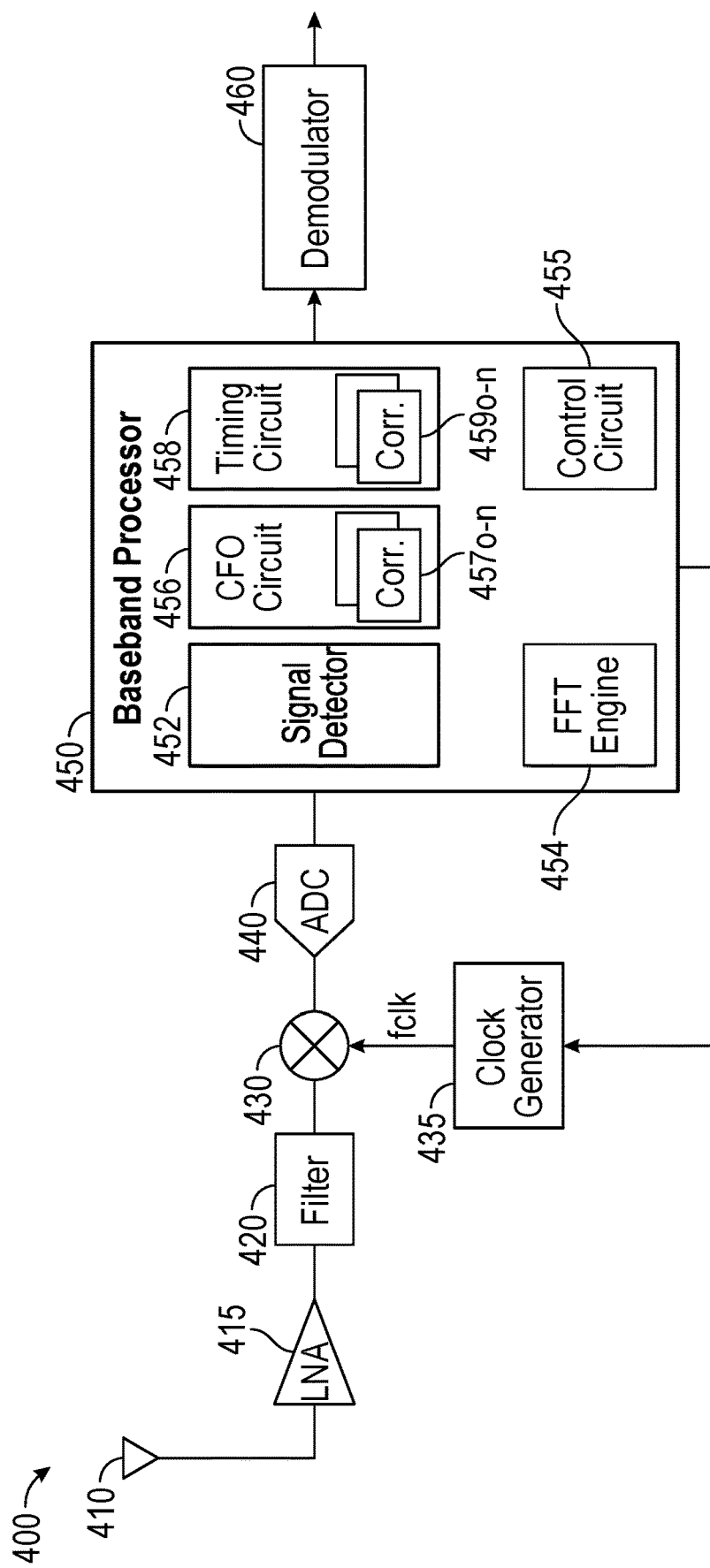
FIG. 4 is a block diagram of a receiver in accordance with an embodiment.

Referring now to FIG. 4, shown is a block diagram of a receiver in accordance with an embodiment. Receiver 400 may be implemented as part of transceiver circuitry of an IoT or other integrated circuit (and thus may be implemented in a single IC along with transmitter 300 of FIG. 3, in some cases). As shown, receiver 400 may receive incoming RF signals via an antenna 410 that in turn is coupled to a low noise amplifier (LNA) 415, which may amplify the signals and provide them to a filter 420. Thereafter, the RF signals may be downconverted to lower frequency signals via a mixer 430 that receives a mixing signal from a clock generator 435. The resulting downconverted signals may be digitized in an analog-to-digital converter (ADC) 440, and then provided to a baseband processor 450 for further processing.

Within baseband processor 450, acquisition operations, including detection, and carrier frequency offset and timing determinations, may be performed. Thus as shown, baseband processor 450 includes a signal detector 452, a CFO circuit 456 and a timing circuit 458. As further shown, baseband processor 450 includes an FFT engine 454, which may take incoming time domain signals and convert them to the frequency domain as a stream of symbols each having multiple carriers. In addition, a control circuit 455 is present and may, based on one or more of signal detection, CFO determination and timing determination, control the receiver configuration to appropriately receive and process an incoming transmission. Thus as shown, control circuit 455 may, e.g., based on a level of carrier frequency offset, send a control signal to clock generator 435 to update a frequency of the mixing signal. In another example, control circuit 455 may enable digital compensation for CFO by controlling baseband processor 450 to perform frequency offset compensation. In different implementations, signal detector 452 may detect presence of an incoming signal based on the incoming time domain signal or a frequency domain signal output by FFT engine 454.

CFO circuit 456, as shown, includes a first plurality of correlators $457_{0-n}$. As described above, each correlator 457 may have an irregular comb structure that is designed to match the irregular carrier spacing of the incoming first preamble portion. Although embodiments are not limited in this regard, there may be 21 correlators 457 each associated with a given carrier frequency offset. Correlators 457 may determine correlation results by performing auto-correlations and/or cross-correlations. By providing an irregular comb structure for use with this first preamble portion, one correlator may fit perfectly for the targeted comb position, while the other correlators fit poorly, such that poor correlation results occur for these other correlators. In an embodiment, a configuration setting (stored in a non-volatile memory) may be used to define the irregular comb structure. As such, the appropriate carrier frequency offset may be readily determined as there is a large deviation between the matching correlator and the other correlators. CFO circuit 456 may provide this CFO determination (both coarse and fine) to control circuit 455, for use in performing any appropriate compensations to compensate for carrier frequency offset.

In turn, timing circuit 458 includes a second plurality of correlators $459_{0-n}$. Depending on implementation, each correlator 459 may have a regular or irregular comb structure that is designed to match the carrier spacing of the incoming second preamble portion. Although embodiments are not limited in this regard, there may be 20 correlators 459 each associated with a given time-phase. In some embodiments, the start of the second preamble portion may be identified using correlation results from both correlators 457 and 459. In these embodiments, the beginning of the second preamble portion can be identified when correlation results from correlators 459 exceed correlation results from correlators 457. In another case, second correlation results alone may be used to identify this second portion start.

Finally with reference to FIG. 4, incoming message information may be sent to a demodulator 460, where demodulation may be performed. Understand while shown at this high level in the embodiment of FIG. 4, many variations and alternatives are possible.

Figure 5:
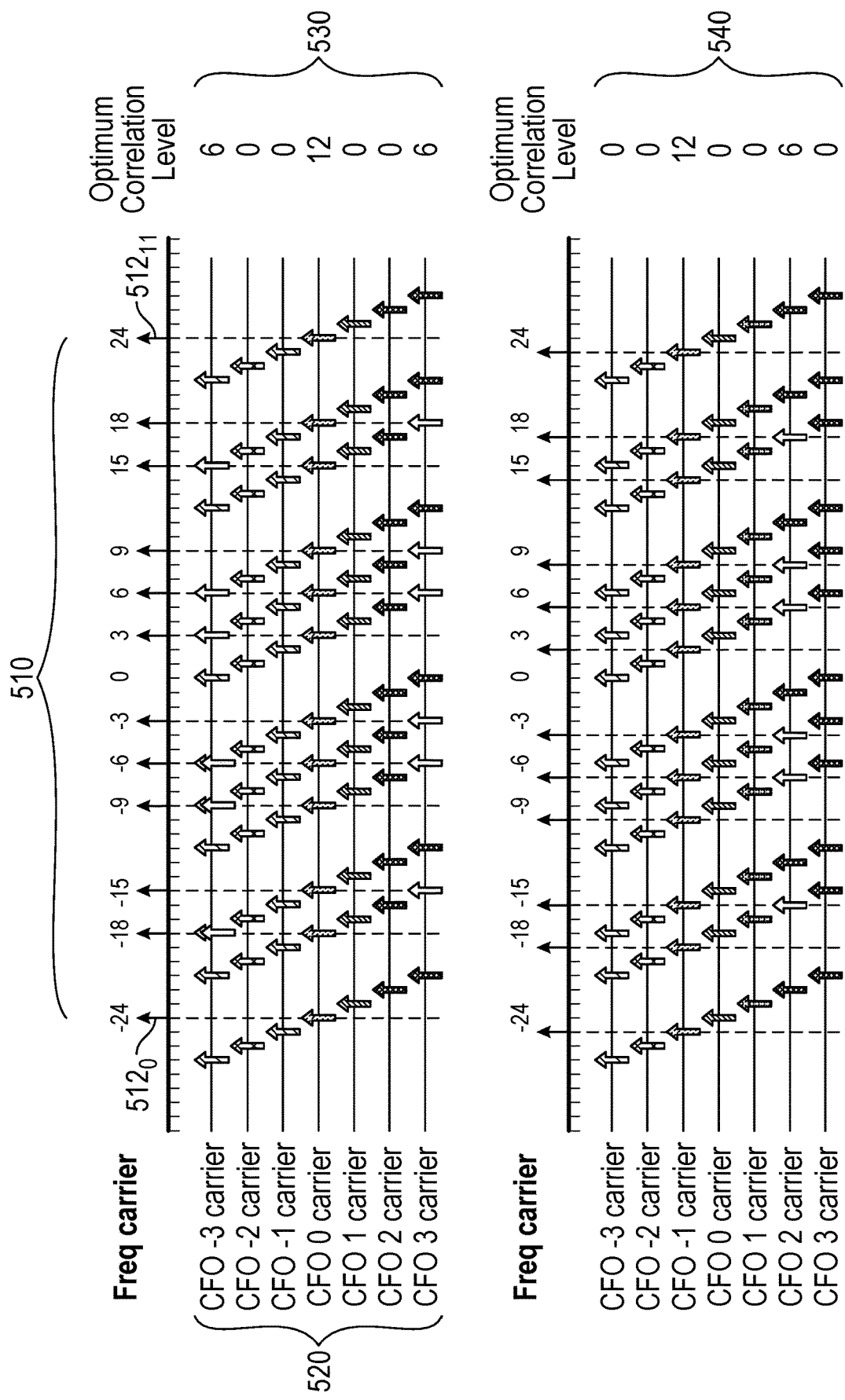
FIG. 5 is a graphical illustration of a representative irregular pilot comb of a first preamble portion and corresponding irregular comb structures of a plurality of correlators of a receiver.

As discussed above, a transmitter may generate a first preamble portion having irregular carrier spacing between non-zero carriers. And in turn, a receiver may include correlators having an irregular pilot comb structure. Referring now to FIG. 5, shown is a graphical illustration of a representative irregular pilot comb of a first preamble portion and corresponding irregular comb structures of a plurality of correlators of a receiver. As shown in FIG. 5, a first preamble portion 510 has a limited set of non-zero carriers $512_0$-$512_{11}$.

FIG. 5 further show correlation results of sets of correlators 520 having different CFO offsets (ranging from zero offset to offsets of +3/−3). As seen in a first example correlation result 530 of a coarse frequency algorithm a coarse frequency perfect correlation result occurs at CFO 0 carrier, which has a perfect correlation level of 12 (in this example). In this case, correlation is maximal for Offset 0 and null for other offsets except offset +3(−3), where correlation is medium.

As further shown in FIG. 5, in a second example correlation result 540 of a coarse frequency algorithm, a coarse frequency perfect correlation result occurs at CFO −1 carrier, which has a perfect correlation level of 12 (in this example). In this case, correlation is maximal for Offset −1 and null for other offsets except offset +2, where correlation is medium.

In these 2 cases (perfect correlation), the coarse frequency algorithm detects that the signal is received with a coarse carrier offset of 0 (in first example 530) and −1 (in second example 540). If in these examples, if the signal is received with a noise level stronger than the signal itself (negative SNR), the correlation on offset +3 (+2, in second example 540) could potentially appear higher than the correlation on offset 0 (−1, in second example 540), which would end with a bad coarse frequency estimation. However, the probability of bad decision on the coarse frequency algorithm is much lower using an irregular comb structure, thanks to a smaller level of correlation on alternative offsets as compared to the optimum offset. In contrast, in conventional correlators leveraging uniform spacing of preamble carriers, alternative offsets can result in correlations much closer to an optimal correlation, potentially leading to an error in coarse CFO determination.

Additional features of a first preamble portion may also enable transmission optimized for power consumption vs transmission power. More particularly, a sequence used for generating the non-zero carriers can be carefully selected to realize a reduced PAPR, leading to better power consumption vs transmission power. Note that such sequence design can be used in a preamble portion having uniform carrier spacing or non-uniform irregular carrier spacing as described above. And while some embodiments may desirably leverage both irregular carrier spacing and a special sequence design, understand that in other cases they can be used independently.

In contrast, conventional preambles such as used in Wi-SUN implement a binary sequence to generate carriers. More specifically, a next sequence of: [−1, −1, −1, 1, 1, 1, 1, −1, 1, 1, −1, 1] results, which is the BPSK modulation of the next binary sequence [1, 1, 1, 0, 0, 0, 0, 1, 0, 0, 1, 0]. This sequence was not chosen randomly. In fact, it is the 12 bit binary sequence that, when BPSK modulated on a set of carriers, gives the smallest PAPR. In the Wi-SUN standard, this PAPR is over 2 dB. In PAPR optimized system, such level can undesirably impact transmitter performances.

With embodiments, a preamble sequence can be used to result in a smaller PAPR, even if all pilots are maintained with the same gain. More specifically in embodiments a sequence of complex numbers may be generated so that the resulting PAPR of a symbol, when applying these complex numbers on the different selected subcarriers is at a minimum level (or at least as small as possible).

These complex numbers can be generated leveraging the understanding that the complex-phase portion of these numbers is not necessarily used in receiver preamble processing. That is, the complex-phase portion is not used to perform any of detection, CFO determination or timing determination. As such, the complex-phase portions can be set at arbitrary or random values to optimize a shape of the transmitted signal to realize better PAPR.

In embodiments, the complex values can be defined as a random or arbitrary sequence, where each complex value has a real portion and an imaginary portion. These individual real (x) and imaginary (y) portions can be squared and summed (as $x^2+y^2$), where x and y are the random values for the real and imaginary portions, respectively, to result in an absolute value of a sum of squares value for a given complex value that substantially equals 1. Of course while in this example, a module of 1 is a constraint selected before trying to find a good sequence, in other cases a different module or other constraint can be selected and complex-phase values adjusted to result in transmission with a reduced PAPR.

For one example, assume a set of non-zero subcarriers having positions [−24, −20, −16, −12, −8, −4, 4, 8, 12, 16, 20, 24] is used, the following arbitrary complex sequence can be applied as shown in Table 1.

TABLE 1

| | | |
|---|---|---|
| −0.661480 + I * −0.749963 | −0.172436 + I * 0.985021 | −0.007412 + I * 0.999973 |
| 0.884100 + I * −0.467298 | −0.883648 + I * −0.468151 | 0.932095 + I * 0.362214 |
| −0.607242 + I * 0.794517 | −0.427617 + I * −0.903960 | 0.541015 + I * −0.841013 |
| 0.993106 + I * −0.117219 | 0.332095 + I * −0.943246 | 0.982724 + I * −0.185078] |

Looking at the first complex number (−0.661480+I*−0.749963), when individual components are squared and summed, a sum of squares of substantially 1 (approximately 0.998) results. For the above example, a 64 carrier OFDM symbol can be generated with a PAPR of substantially 1.23 dB.

Of course, while specific numbers are illustrated above for one example, understand that many other combinations of arbitrary complex numbers can be used in other embodiments. Further, these numbers need not have the precision (6 places) shown above, and can be selected with greater or smaller precision in other cases.

According to the Wi-SUN specification, its preamble has a complex-phase disruption at the end. This inverse complex-phase section is used for coarse timing. However, such a complex-phase disruption gives good synchronization only for positive SNRs (or down to −2 −3 dB).

In embodiments, to enable receivers to receive and successfully process weaker signals, a second preamble portion may be used that has a waveform having a frequency disruption rather than a complex-phase disruption. In example embodiments, this preamble portion may have a waveform that is based on a known pattern of OFDM subcarrier modulation. In one example, the disruption is based on a frequency jump from one OFDM symbol to the next. By doing so, if a coarse and fine frequency algorithm have converged during the first step, a coarse time algorithm will recover information from the whole time/frequency plane. In some cases, there may be a modulation from symbol to symbol on this frequency disruption part.

Different scenarios are possible for this waveform. In one implementation, a frequency step is regular (from 1 symbol to the next), also referred to as a frequency sweep scenario.

Figure 6:
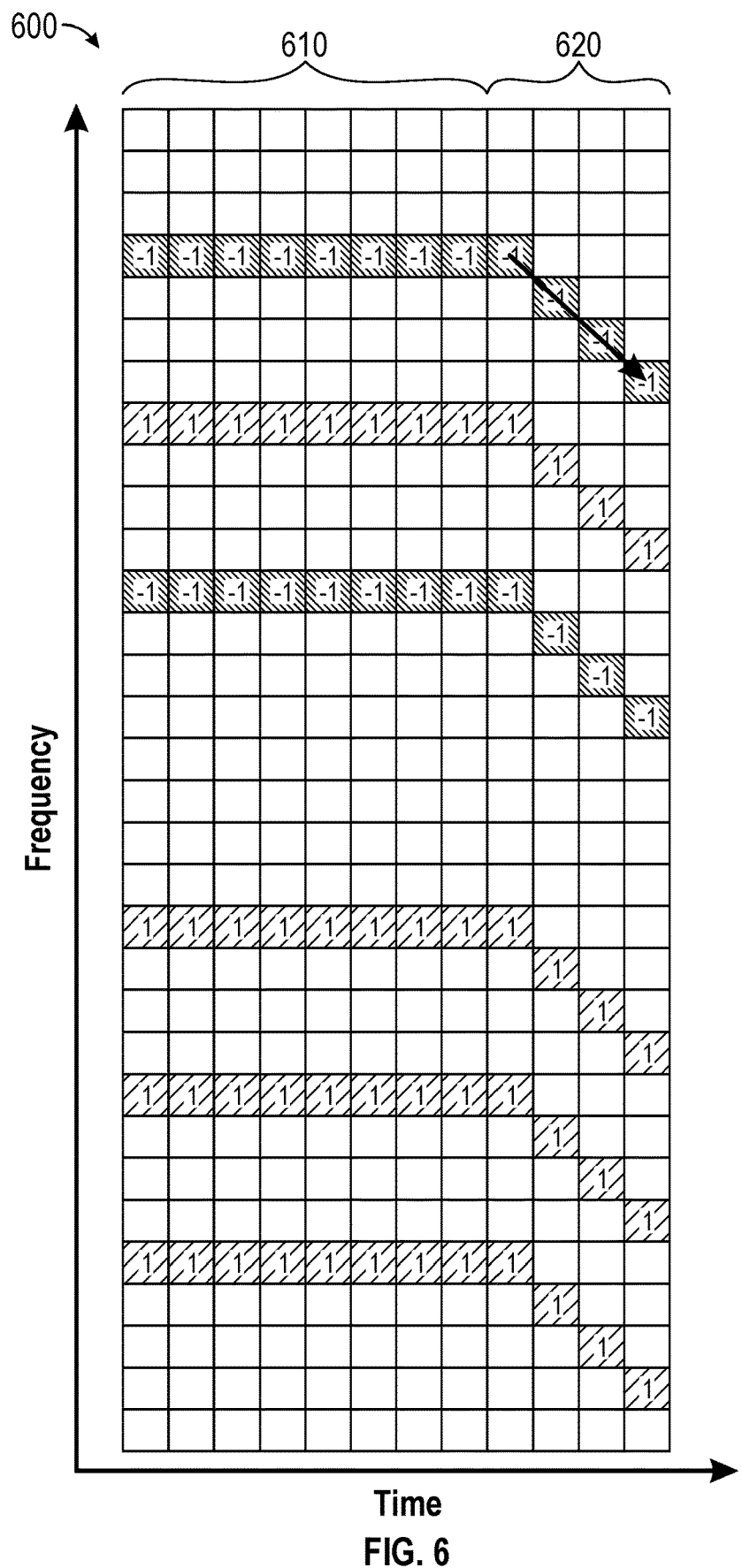
FIG. 6 is a graphical illustration of an example preamble including a first portion having a plurality of symbols followed by a second portion also having a plurality of symbols.

As shown in FIG. 6, a preamble 600 (which may be a transition section of preamble between preamble portions) includes a first portion 610 having a plurality of symbols (in the time domain) followed by a second portion 620 also having a plurality of symbols. In this example, in first portion 610, each non-zero carrier (in the frequency domain) has the same value (shown generically as a 1 or −1 value; of course different values, including complex values may be used to modulate these carriers). And in first portion 610, the non-zero carriers are static in that they do not change from symbol to symbol. Then second portion 620 (having similarly generic 1 or −1 values so as to not obscure the frequency disruption aspect; however understand that there may symbol-to-symbol modulation in second portion 620) provides a frequency disruption by way of a sweep of one carrier from one symbol to another. Of course in other examples, the frequency sweep between symbols may be more than a single carrier, and can proceed in a positive or negative direction.

Figure 7:
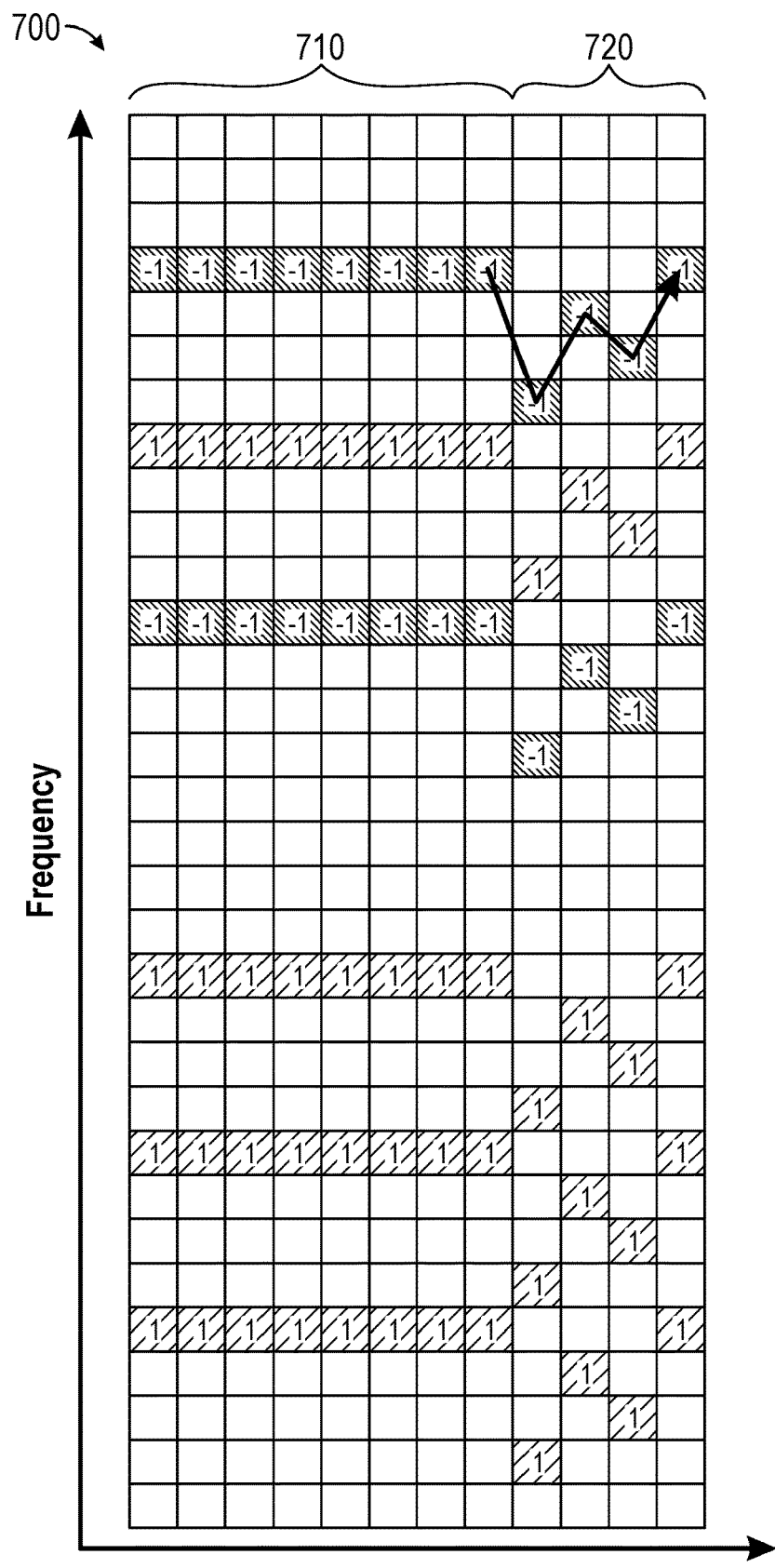
FIG. 7 is a graphical illustration of another example preamble including a first portion followed by a second portion.

In another scenario a frequency step is not regular (from one symbol to the next), also referred to as a frequency hop scenario. As shown in FIG. 7, a preamble 700 (which may be a transition section of preamble between preamble portions) includes a first portion 710 followed by a second portion 720. In this example, in first portion 710, each non-zero carrier has the same static value and second portion 720 provides a different frequency disruption by way of hopping carriers from one symbol to another. As shown in FIG. 7, which is one example of a frequency hop scenario, there is a positive jump of 3 carriers, then a negative jump of 2 carriers, followed by a positive jump of 1 carrier, in turn followed by a negative jump of 2 carriers. This sequence may continue for a remainder of second preamble 720, or a hop sequence can include additional jumps before proceeding again through the sequence. Of course in other examples, the frequency hop between symbols can vary.

Figure 8:
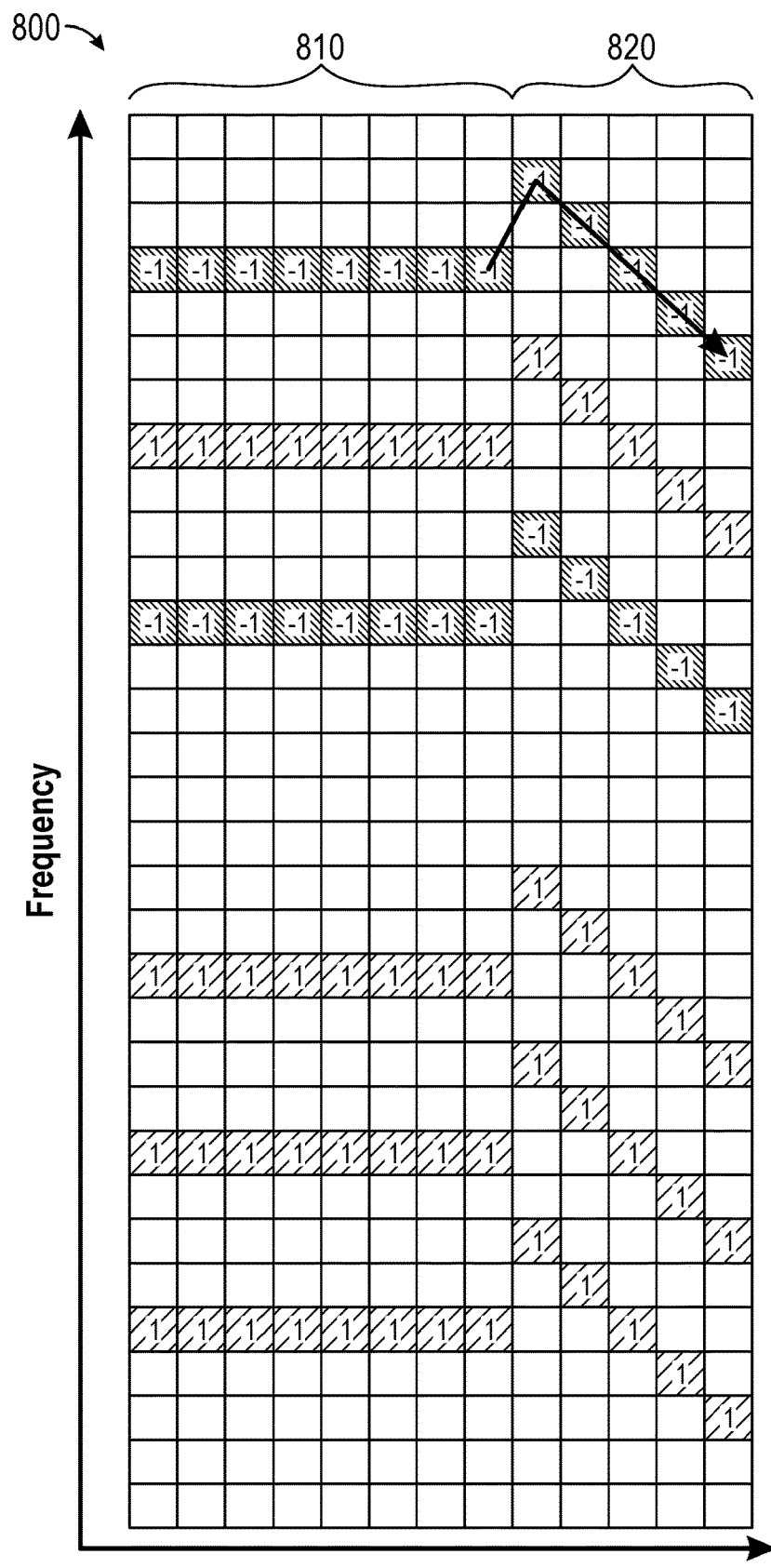
FIG. 8 is a graphical illustration of yet another example preamble including a first portion followed by a second portion.

In yet another scenario, a frequency step is regular (from one symbol to the next), with a hop at first, also referred to as a frequency mix scenario. As shown in FIG. 8, a preamble 800 (which may be a transition section of preamble between preamble portions) includes a first portion 810 followed by a second portion 820. In this example, in first portion 810, each non-zero carrier has the same static value and second portion 820 provides a different frequency disruption by way of a frequency mix. As shown in this example, there is an initial hop of two carriers (in the positive frequency direction) from the last symbol of first portion 810 to the first symbol of second portion 820. And then a frequency sweep of one carrier (in the negative frequency direction) proceeds from one symbol to the next. Of course, other examples are possible. For example, a frequency mix scenario may first take the form of a frequency sweep followed by a frequency hop. Or combinations of multiple sweeps and hops may occur.

Figure 9:
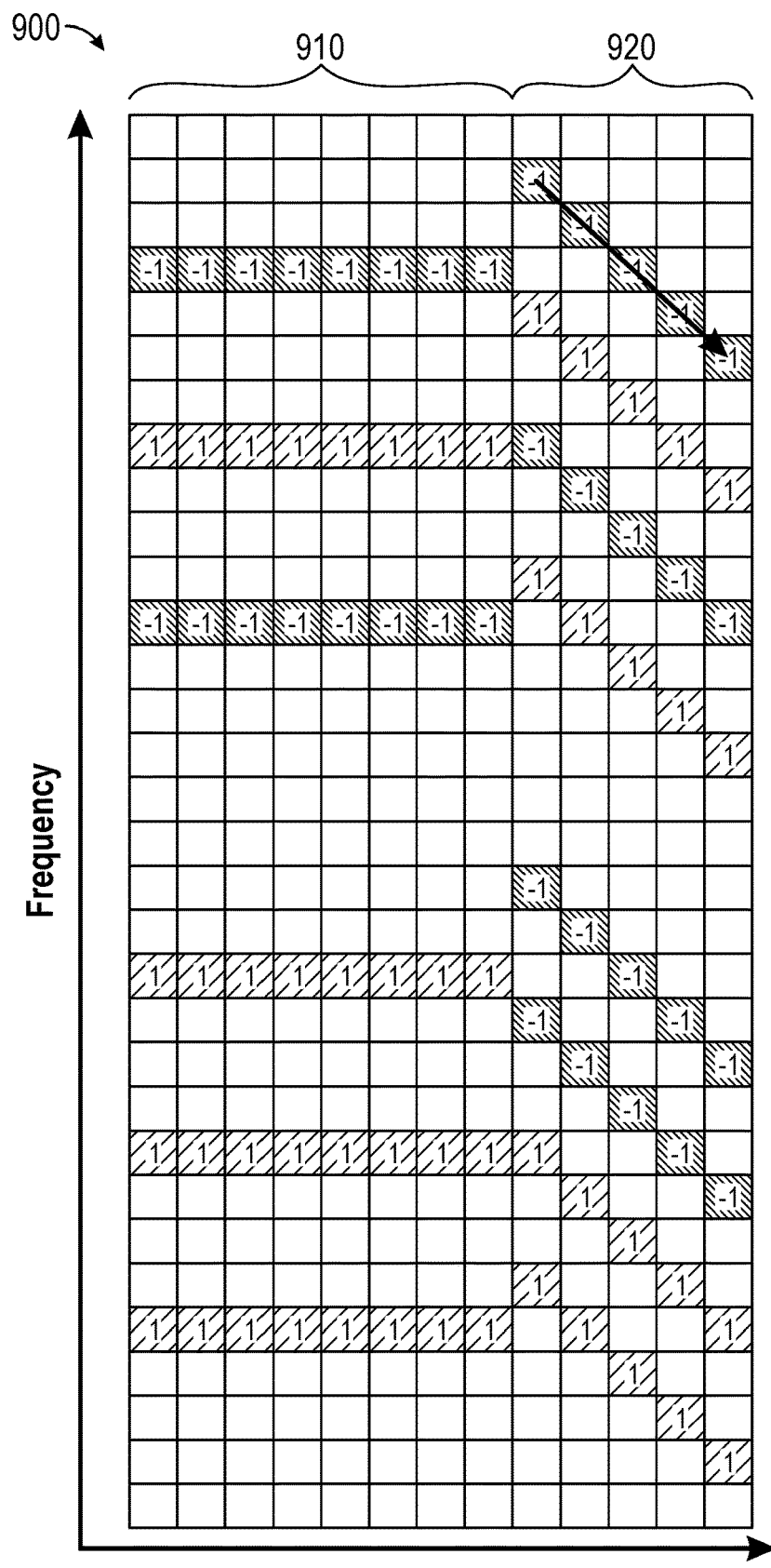
FIG. 9 is a graphical illustration of a still further example preamble including a first portion followed by a second portion.

Note that a frequency disruption sequence can be different than the sequence used for a first preamble portion. Referring now to FIG. 9, a preamble 900 (which may be a transition section of preamble between preamble portions) includes a first portion 910 followed by a second portion 920. In this example, in first portion 910, each non-zero carrier has the same static value and second portion 920 provides a different frequency disruption by way of a frequency sweep. Note in this example, there are different numbers of non-zero carriers in the two preamble portions, and thus second preamble 920 does not use the same sequence as first preamble 910. While this example shows a frequency sweep case, hops and mix scenarios may similarly leverage different sequences for different preamble portions. Moreover, in this example, the number of active carriers being different in portion 910 and 920, an adjustment gain could be applied to each symbol to adjust the average power.

In yet another implementation, a disruption zone can be a continuous sequence that uses contiguous carriers. This disruption portion may be based on a known OFDM symbol that is frequency shifted from one symbol to the next with a known hopping sequence, regardless of the previous part of the preamble.

Figure 10:
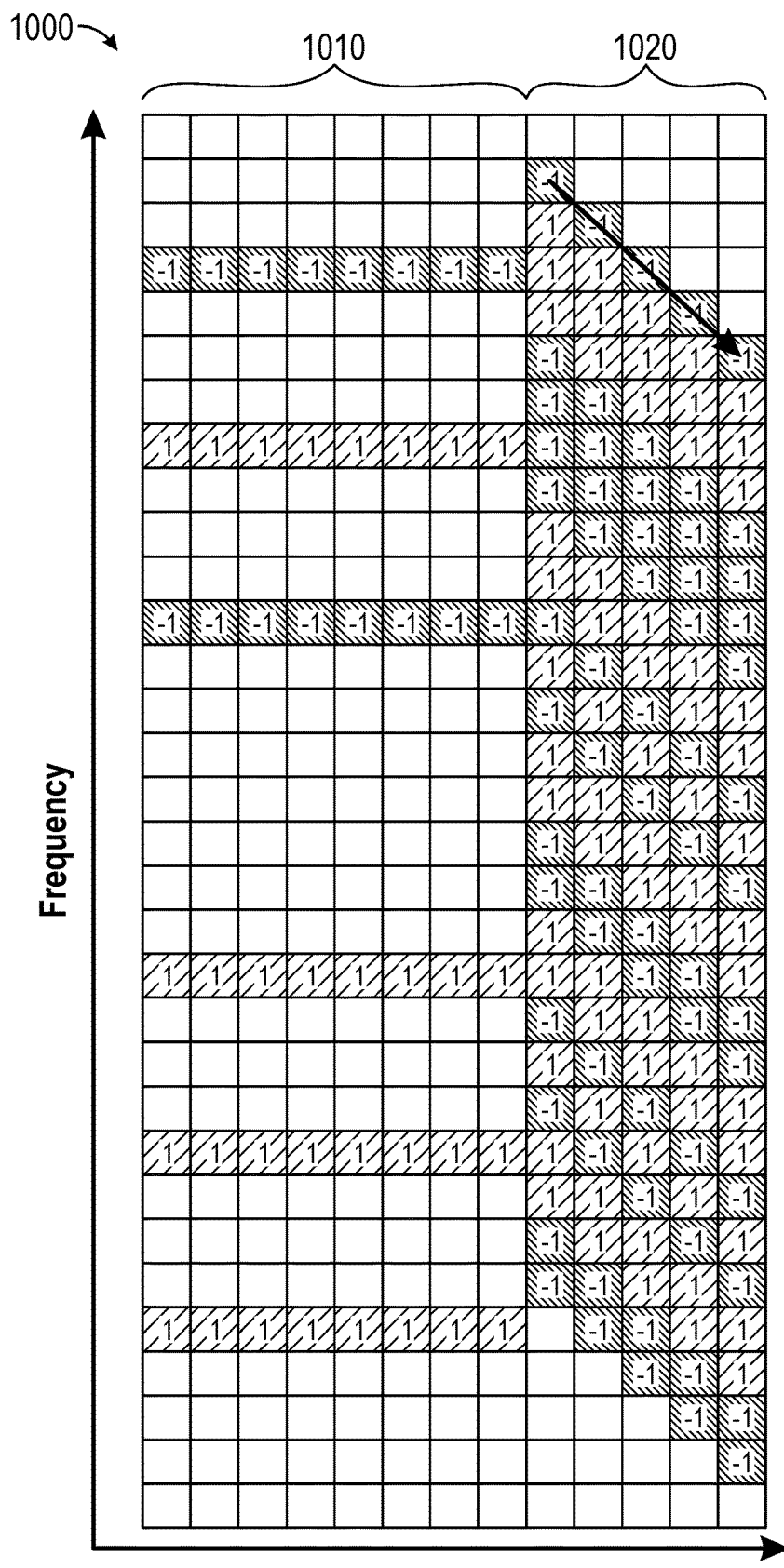
FIG. 10 is a graphical illustration of an example preamble for a frequency mix scenario with a shift sequence having continuous carriers for disruption.

Referring now to FIG. 10, shown is a frequency mix scenario with a shift sequence having continuous carriers for disruption. As shown in FIG. 10, a preamble 1000 (which may be a transition section of preamble between preamble portions) includes a first portion 1010 followed by a second portion 1020. In this example, in first portion 1010, each non-zero carrier has the same static value and second portion 1020 provides a frequency disruption first with a frequency hop followed by a frequency sweep. And note the presence of contiguous carriers. Thus it is possible for a frequency disruption to not necessarily be linked to a comb of active carriers, but can even be used with a continuously active carriers symbol. Different scenarios of course may be used in other examples. In this example again, the number of active carriers being different in portion 1010 and 1020, an adjustment gain could be apply to each symbol to adjust the average power.

Figure 11:
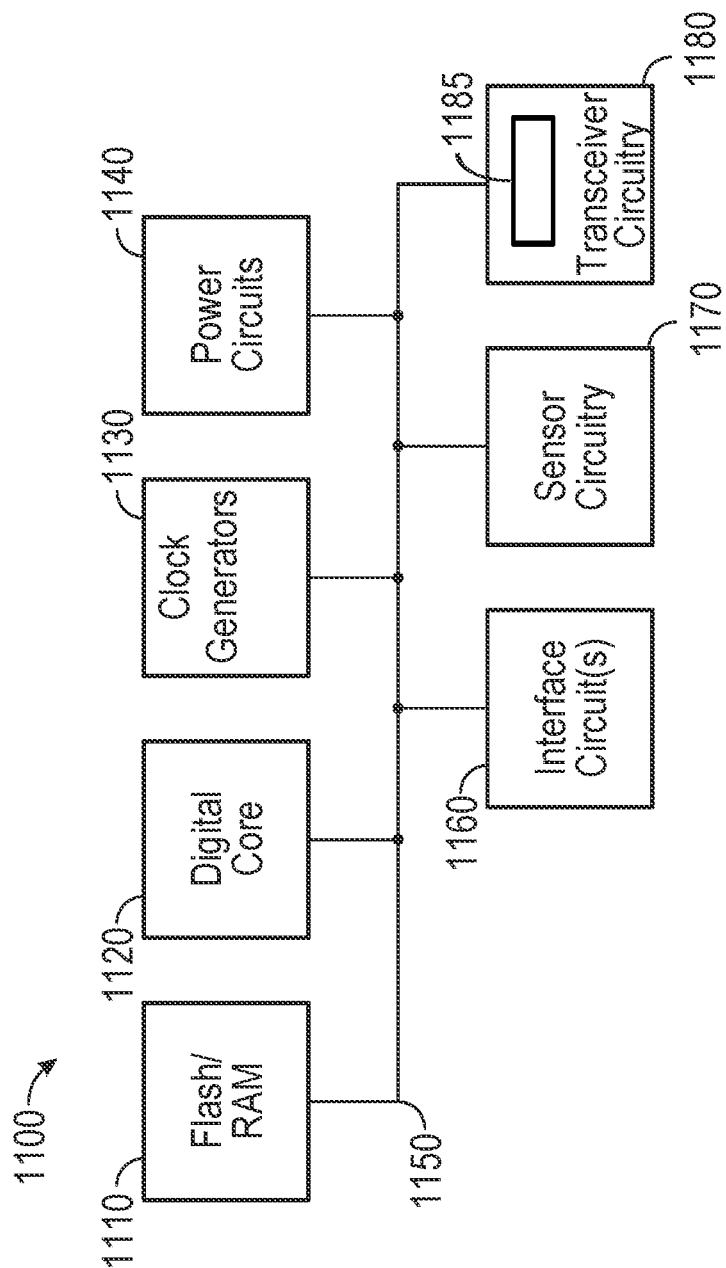
FIG. 11 is a block diagram of a representative integrated circuit that incorporates an embodiment.

Referring now to FIG. 11, shown is a block diagram of a representative integrated circuit 1100 that includes transceiver circuitry as described herein. In the embodiment shown in FIG. 11, integrated circuit 1100 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 1100 includes a memory system 1110 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for generating and processing preambles and data for generating the preambles having particular irregular comb structures and/or using non-N-ary complex values and/or frequency distortions described herein.

Memory system 1110 couples via a bus 1150 to a digital core 1120, which may include one or more cores and/or microcontrollers that act as a main processing unit of the integrated circuit. In turn, digital core 1120 may couple to clock generators 1130 which may provide one or more phase locked loops or other clock generator circuitry to generate various clocks for use by circuitry of the IC.

As further illustrated, IC 1100 further includes power circuitry 1140, which may include one or more voltage regulators. Additional circuitry may optionally be present depending on particular implementation to provide various functionality and interaction with external devices. Such circuitry may include interface circuitry 1160 which may provide interface with various off-chip devices, sensor circuitry 1170 which may include various on-chip sensors including digital and analog sensors to sense desired signals, such as for a metering application or so forth.

In addition as shown in FIG. 11, transceiver circuitry 1180 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 1180 includes a PA 1185 that may transmit OFDM signals having low PAPR as described herein. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 12:
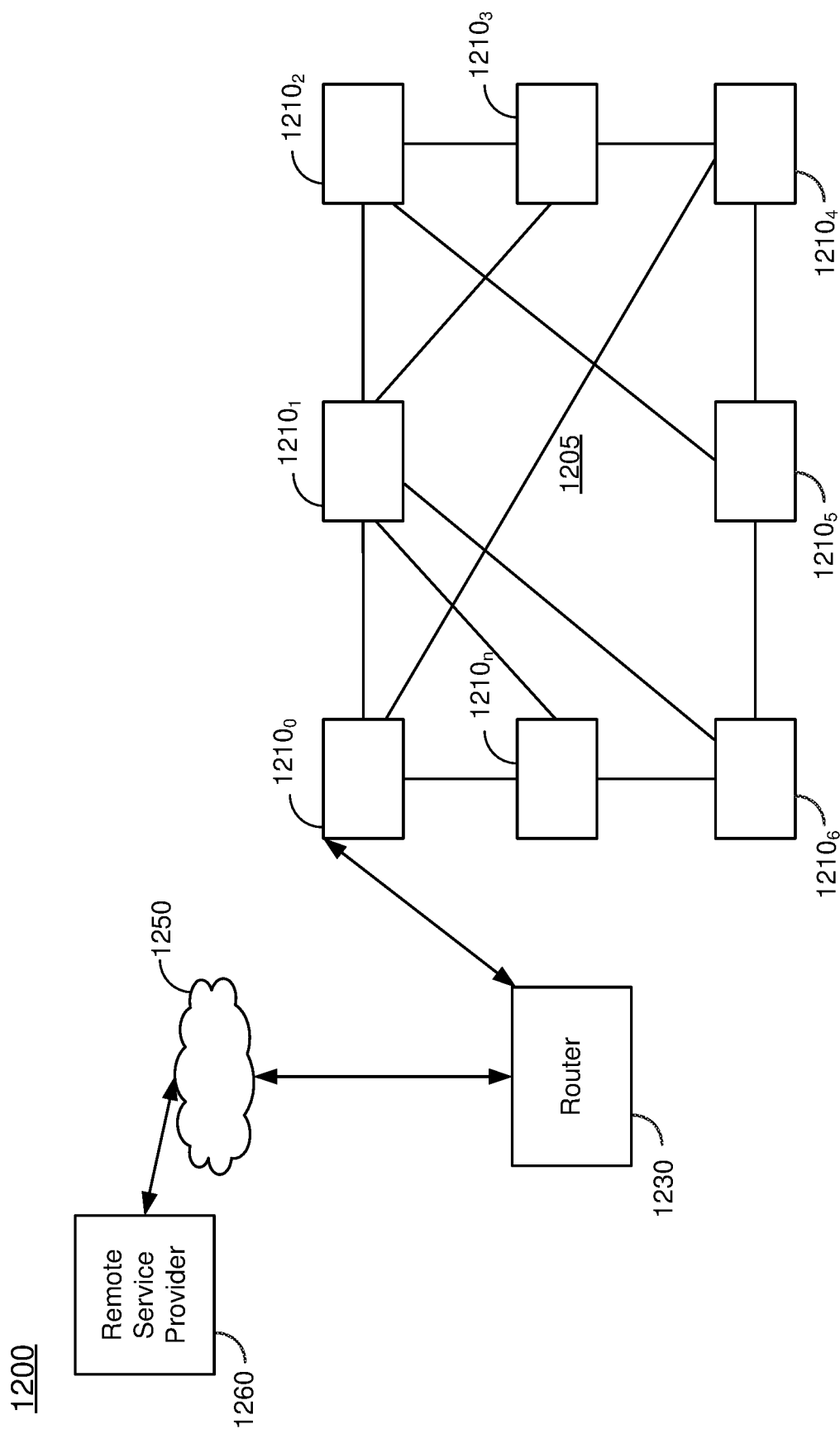
FIG. 12 is a high level diagram of a network in accordance with an embodiment.

Referring now to FIG. 12, shown is a high level diagram of a network in accordance with an embodiment. As shown in FIG. 12, a network 1200 includes a variety of devices, including smart devices such as IoT devices, routers and remote service providers. In the embodiment of FIG. 12, a mesh network 1205 may be present in a location having multiple IoT devices $1210_{0-n}$. Such IoT devices may generate and process preambles of OFDM packets as described herein. As shown, at least one IoT device 1210 couples to a router 1230 that in turn communicates with a remote service provider 1260 via a wide area network 1250, e.g., the internet. In an embodiment, remote service provider 1260 may be a backend server of a utility that handles communication with IoT devices 1210. Understand while shown at this high level in the embodiment of FIG. 12, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
 a radio frequency (RF) front end circuit to receive and downconvert a RF signal to a second frequency signal, the RF signal comprising an orthogonal frequency division multiplexing (OFDM) transmission;
 a digitizer coupled to the RF front end circuit to digitize the second frequency signal to a digital signal; and
 a baseband circuit coupled to the digitizer to process the digital signal, wherein the baseband circuit comprises a first circuit having a first plurality of correlators having an irregular comb structure, each of the first plurality of correlators associated with a carrier frequency offset and to calculate a first correlation on a first portion of a preamble of the OFDM transmission.

2. The apparatus of claim 1, wherein the apparatus is to receive the first portion of the preamble having a first plurality of symbols, each of the first plurality of symbols having a plurality of carriers, wherein a first subset of the plurality of carriers have non-zero values.

3. The apparatus of claim 2, wherein the apparatus is to receive the plurality of carriers comprising N carriers, wherein N−M of the N carriers are the first subset having the non-zero values, wherein N is a number of the plurality of carriers and M is a number of the plurality of carriers having a zero value, N greater than M.

4. The apparatus of claim 3, wherein at least some of the N−M carriers have irregular carrier spacing.

5. The apparatus of claim 4, wherein the irregular comb structure of the first plurality of correlators corresponds to the irregular carrier spacing of the at least some N−M carriers.

6. The apparatus of claim 3, wherein the apparatus is to receive the N−M non-zero values formed by a non-N-ary complex number sequence.

7. The apparatus of claim 2, further comprising a fast Fourier transform (FFT) engine to receive the OFDM transmission and to output the first plurality of symbols each having the plurality of carriers in a frequency domain.

8. The apparatus of claim 2, wherein the apparatus is to receive the first plurality of symbols comprising identical symbols.

9. The apparatus of claim 1, wherein the first circuit comprises a carrier frequency offset circuit to determine a carrier frequency offset based on the first correlation calculated by the first plurality of correlators.

10. The apparatus of claim 9, wherein the baseband circuit further comprises a second circuit having a second plurality of correlators, each of the second plurality of correlators associated with a time-phase, a second portion of the preamble having at least one frequency disruption, each of the second plurality of correlators to calculate a second correlation on the second portion of the preamble.

11. The apparatus of claim 1, further comprising a non-volatile memory to store a first configuration setting to define the irregular comb structure of the first plurality of correlators.

12. A method comprising:
receiving an orthogonal frequency division multiplexing (OFDM) transmission in a receiver; and
performing a frequency estimation on a first preamble portion of the OFDM transmission using a plurality of correlators of the receiver, the first preamble portion formed of a plurality of symbols, each of the plurality of symbols having N−M non-zero carriers, wherein at least some of the N−M non-zero carriers are irregularly spaced, wherein N is a number of carriers in a symbol and M is a number of the carriers in the symbol having a zero value, N greater than M.

13. The method of claim 12, further comprising using the plurality of correlators comprising a set of irregularly spaced comb correlators to perform the frequency estimation, wherein the set of irregularly spaced comb correlators corresponds to the irregular spacing of the at least some N−M non-zero carriers.

14. The method of claim 13, further comprising performing a coarse frequency estimation on the first preamble portion using the set of irregularly spaced comb correlators.

15. The method of claim 14, further comprising performing a fine frequency estimation on the first preamble portion based on the coarse frequency estimation and using the set of irregularly spaced comb correlators.

16. The method of claim 15, further comprising configuring the receiver for receipt of a data portion of the OFDM transmission based at least in part on the fine frequency estimation.

17. The method of claim 16, wherein configuring the receiver comprises adjusting a frequency of a mixing signal used to downconvert a radio frequency (RF) signal of the OFDM transmission to a lower frequency signal.

18. A system comprising:
an antenna to receive and transmit radio frequency (RF) signals; and
an integrated circuit coupled to the antenna, the integrated circuit comprising:
a transmitter to generate and transmit an orthogonal frequency division multiplexing (OFDM) transmission, the transmitter comprising a preamble generation circuit to generate a first portion of a preamble of the OFDM transmission having a first plurality of symbols, each of the first plurality of symbols having a plurality of carriers, wherein a first subset of the plurality of carriers have non-zero values, at least some of the first subset of the plurality of carriers having irregular carrier spacing.

19. The system of claim 18, wherein the integrated circuit comprises a first storage to store an identification of the first subset of the plurality of carriers having the non-zero values.

20. The system of claim 19, wherein the transmitter is to transmit the first portion of the preamble having the irregular carrier spacing to optimize coarse frequency processing at a receiver of the OFDM transmission.

* * * * *